United States Patent [19]

Sharp et al.

[11] 4,120,069

[45] Oct. 17, 1978

[54] ADAPTER FOR COUPLING WINDSHIELD WIPER BLADE HOLDER WITH HOOKED WIPER ARM

[75] Inventors: Bernard C. Sharp, White Plains, N.Y.; John T. Petrik, Newtown, Conn.

[73] Assignee: Parker-Hannifin Corporation, Shelton, Conn.

[21] Appl. No.: 789,233

[22] Filed: Apr. 20, 1977

[51] Int. Cl.$^2$ .............................................. B60S 1/40
[52] U.S. Cl. ................................................. 15/250.32
[58] Field of Search ........... 15/250.32, 250.33, 250.34, 15/250.35, 250.31, 250.42

[56] References Cited

U.S. PATENT DOCUMENTS

| 3,757,377 | 9/1973 | Hayhurst | 15/250.32 |
| 3,872,537 | 3/1975 | Bianchi | 15/250.32 |

FOREIGN PATENT DOCUMENTS 893,229  4/1962  United Kingdom .................. 15/250.32

*Primary Examiner*—George F. Mautz
*Attorney, Agent, or Firm*—Albert C. Johnston

[57] ABSTRACT

An adapter for coupling a windshield wiper blade holder with a wiper arm of the type having a hooked end is provided as a unitary molded body of a resilient plastic material forming similarly shaped side panels held spaced apart and joined together by a front wall and a cross shaft which are so disposed relative to portions of the panels that the arm hook can be engaged onto the shaft when the body is turned away from a posture in which it can be coupled with the blade holder, and will be captured operably in the adapter when the body is turned back to that posture.

7 Claims, 9 Drawing Figures

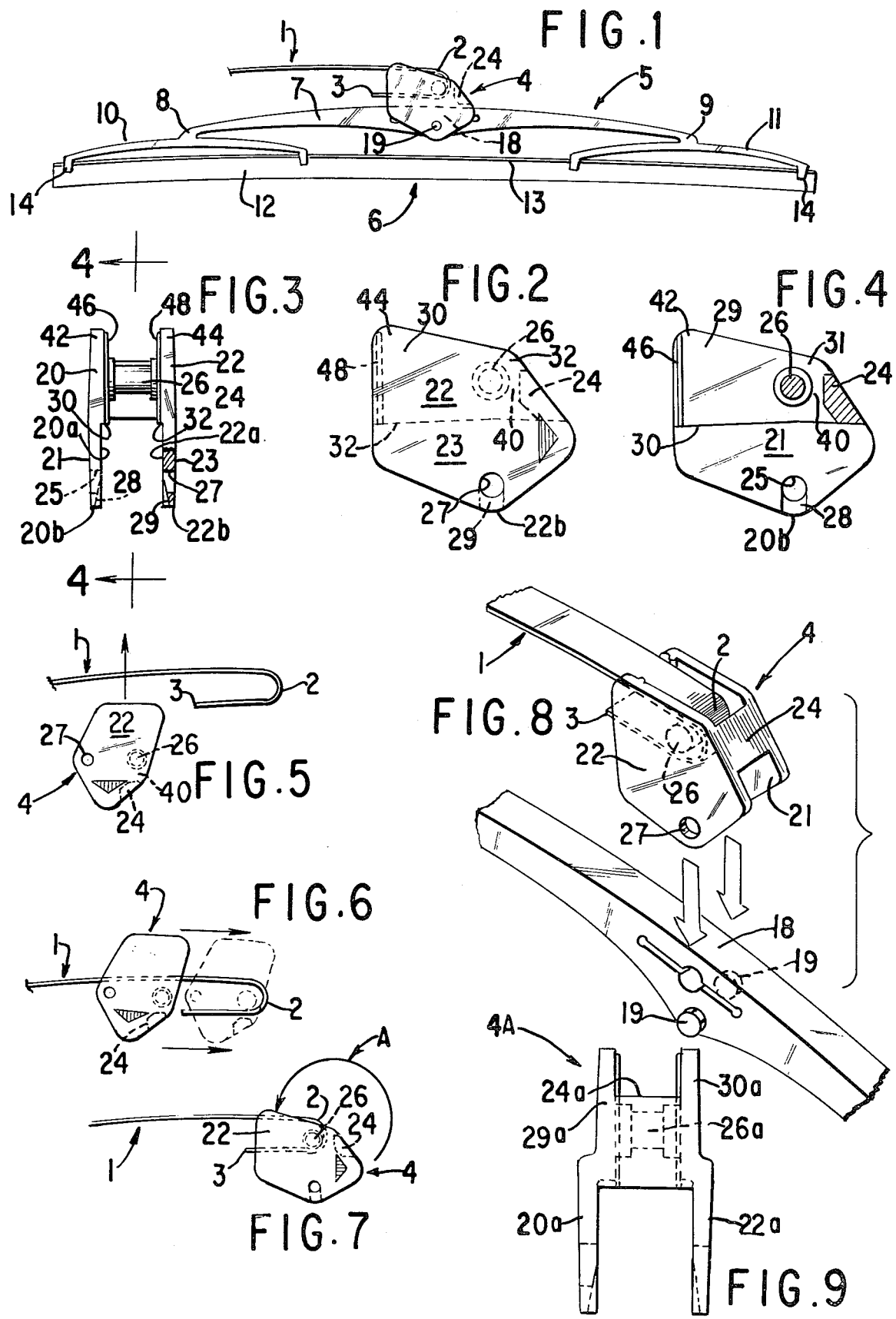

ADAPTER FOR COUPLING WINDSHIELD WIPER BLADE HOLDER WITH HOOKED WIPER ARM

The present invention relates to windshield wipers and, more particularly, to an adapter for connecting a wiper blade holder, or arm pressure distributor, with a wiper arm of the type terminating in a hook, i.e., having an end portion turned back through a U bend into a finger along the arm.

Various forms of coupling structures have been proposed, such as those set forth in U.S. Pat. Nos. 2,147,113; 2,432,692; 3,757,377; 3,896,519 and 3,942,212, for connecting a windshield wiper arm of the type mentioned with a blade holder, or pressure distributing superstructure, of a windshield wiper. These known coupling structures in general are objectionably complex to manufacture or to install for use, or to disassemble from coupled condition when required for replacement of a coupled component of the windshield wiper.

The principal object of the present invention is to provide an adapter or coupling device of quite simple and economical construction which is easy to assemble in coupled relation to a wiper arm of the hook type and an appropriate wiper blade holder and which holds these components securely coupled together for all use of the windshield wiper yet enables them to be disassembled readily and a replacement component substituted when desired.

The adapter or coupling device provided according to the invention comprises a unitary molded body of resilient material forming two similarly shaped side panels joined together and held spaced apart by a front wall and a cross shaft which extend between forward upper portions of the panels. The upper portions of the panels are spaced apart so as to receive between them the hooked end of a wiper arm of the hook type, and the panels have oppositely disposed lower portions which are formed with coupling elements to mate with and couple the adapted body to coupling elements on a central portion of a wiper blade holder for which the device is adapted. The cross shaft and the front wall of the molded body are spaced apart longitudinally of these panels and disposed relative to the lower portions and backward upper portions of the panels so that the adapter body apart from the blade holder can be held in a posture in which backward portions of the panels straddle the wiper arm and the space between the cross shaft and the front wall is aligned with the finger of the arm hook, whereupon the finger can be passed through that space to engage the shaft pivotably in the hook, and upon an ensuing turning of the adapter body about the axis of the shaft to a position for coupling with the blade holder, the hook will be captured transversely by the shaft, longitudinally between the shaft and the front wall and laterally between the upper portions of the panels.

By virtue of this arrangement of the elements, the adapter according to the invention can be coupled securely with a wiper arm simply by holding it in a suitable posture, sliding it in place on the arm hook and then turning it back to a normal working position for coupling it with a wiper blade holder. Then it can be coupled securely with the blade holder simply by engaging the coupling elements on the lower portions of its panels with mating coupling elements on the blade holder, which can be of any desired form suitable for the purpose.

In an embodiment of the invention suited for a well known form of blade holder such as that disclosed in U.S. Pat. No. 3,928,887, which has short posts protruding from opposite sides of the central portion of its primary bow member for coupling it with a wiper arm adapter, the lower portions of the adapter panels are formed to straddle the central portion of the blade holder, and sockets are formed in them which fit and can easily be engaged onto the posts for coupling the adapter and blade holder together. The lower panel portions of such an embodiment preferably have on their inner sides respective recessed surfaces which are sloped upwardly and inwardly from their lower edges to the sockets so that the sockets can be engaged onto the posts simply by engaging the recessed surfaces with the ends of the posts and pressing the adapter downward, whereupon the sloped surfaces bearing against the ends of the posts slide downward and spring the lower panel portions elastically apart by a wedging action until the sockets are engaged onto the posts.

According to another feature of the invention, the side panels of the adapter are formed along their inner sides with downardly facing ledges which are located at a level spaced above the coupling elements on the panels so that these ledges, by engaging against the upper surface of the central portion of the blade holder, will limit pivotal movement of the adapter relative to the blade holder when the adapter is coupled in working position.

Another feature of the invention consists in that the backward upper portions of the adapter panels are provided with corner portions which extend to a height above the forward upper portions of the panels so that the backward upper portions, when disposed away from a wiper arm, can be converged elastically by pressure of a person's fingers, with resultant divergence of the lower panel portions to aid engagement or disengagement of the coupling elements on the panels and the blade holder.

According to still another feature of the invention, the backward upward portions of the adapter panels have inwardly protruding elongate ribs formed on their inner sides along their backward, normally upright edges. These ribs are positioned to limit lateral movement of the wiper arm relative to the adapter by engaging the side edges of the hooked end of the arm.

The foregoing and other objects, features and advantages of the invention will be further apparent from the following detailed description and the accompanying drawings of illustrative embodiments of the invention.

In the drawings:

FIG. 1 is a side elevational view of a windshield wiper assembly including an adapter provided according to the present invention;

FIG. 2 is an enlarged side elevational view of the adapter;

FIG. 3 is an end elevational view thereof, partly in section;

FIG. 4 is a cross sectional view taken along line 4—4 of FIG. 3;

FIGS. 5, 6 and 7 are side elevational views showing positions and movements employed for coupling the adapter with a wiper arm;

FIG. 8 is a perspective view showing a manner of coupling the adapter and wiper arm with a wiper blade holder; and FIG. 9 is an end elevational view of a modified form of the adapter.

The windshield wiper assembly shown in FIG. 1 comprises a wiper arm 1 of the type having its free end terminating in a hook 2 that is coupled by means of an adapter 4 embodying the present invention with a blade holder 5 for distributing the pressures and movements imparted by the wiper arm to a wiper blade or refill unit 6. The blade holder 5 and the blade or refill unit 6 may each have any of various known forms, including some which are widely used for automobile windshield wipers. For instance, as illustrated, the blade holder is of the form shown in U.S. Pat. No. 3,928,887, and comprises a unitary molding of a suitable plastic material forming a primary bow member 7 having ends 8 and 9 molded integrally with the midportions of respective secondary bow members 10 and 11 which have claws 14 formed integrally with their ends for holding and for applying pressure to the blade unit. The blade unit, for instance, includes an elastomeric wiping element or squeegee 12 supported in a backing strip 13 that is flexible in planes transverse to a windshield and is held slidably in the claws 14 but is prevented from sliding out of the claws by a suitable clip or detent structure (not shown).

It will be noted that the central portion 16 of the bladeholder 5 is formed with short posts 19 of cylindrical shape, which protrude from its opposite sides and can serve as coupling elements for the arm adapter or coupling device.

The adapter 4 in the embodiment shown is a unitary molded body composed of a strong resilient plastic material, such as a polycarbonate resin impregnated with carbon black, forming two similarly shaped side panels 20 and 22 which are joined together integrally and spaced apart by a front wall 24 and a cross bar or shaft 26. The side panels have respective lower portions 21 and 23 which are spaced apart so as to straddle the central portion 18 of the blade holder and are formed with sockets 25 and 27, respectively, at a location near their lower ends. The sockets have the form of cylindrical holes which mate with and can be fitted onto the side post 19 of the blade holder 5 for coupling the adapter 4 with this blade holder.

The lower portions of the side panels have on their inner sides 20a and 22a recessed surfaces, or lead-in ramps, 28 and 29 which are sloped upwardly and inwardly (see FIG. 3) from the lower edges 20b and 22b of the panels to edges of the sockets 25 and 27. The adapter can be coupled with the blade holder simply by fitting it onto the blade holder so that lower parts of the surfaces 28 and 29 are engaged with the ends of the posts and then pressing it downward, whereupon the ends of the posts will spring the lower panel portions elastically apart by a wedging action until the sockets engage onto the posts.

A principal feature of the invention consists in the positional relationships provided on the one hand between the front wall 24 and cross shaft 26 of adapter 4 and the hooked end, such as end 1, of a wiper arm to be coupled by the adapter, and on the other hand between these elements and the backward upper portions 29 and 30 and blade coupling lower portions 21 and 23 of the adapter panels. Considered in relation to the normal coupling posture of the adapter, the front wall 24 and cross shaft 26 extend between forward upper portions 31 and 32 of the panels and hold these portions as well as the merging backward upper portions of the panels spaced apart by a distance slightly greater than the width of the widest wiper arm hook to be connectable with the adapter. Further, wall 24 and shaft 26 are spaced apart longitudinally of the panels by a distance at 40 (FIG.4) exceeding the thickness of the tongue of the wiper arm hook. The space 40 is preferably made wide enough to admit through it the tongue at the end of any common form of wiper arm hook, including either a tongue 3 of the form illustrated in the drawings or one having a retaining tab struck out from its body.

By virtue of these positional relationships, the adapter 4 may be easily coupled with the hooked end of the wiper arm, and subsequently coupled with a fitting blade-holder, by a sequence of steps illustrated in FIGS. 5-8. When the adapter apart from the blade holder is turned to a position about 90° clockwise away from its normal posture, as shown in FIG. 5, the adapter has a posture enabling the normally backward portions of its panels 20 and 22 to straddle the wiper arm 1 so that the space 40 between the front wall 24 and the cross shaft 26 will be aligned with the finger 3 of the arm hook, as shown in FIG. 6. Then the finger 3 can be passed through the space 40 so as to engage the cross shaft 26 in the loop of the hook, as shown in broken lines in FIG. 6, and upon an ensuing counterclockwise turning of the adapter body about the axis of the cross shaft, as indicated by the arrow A, the adapter is brought back to its normal posture with the hook end securely captured in its structure and the adapter in a position for coupling with the blade holder 5. In this arm-coupled condition, as shown in FIG. 7, the wiper arm hook is captured transversely by the cross shaft 26, longitudinally between the cross shaft 26 and the front wall 24, and laterally between the upper portions of the panels 20 and 22. Then, as illustrated in FIG. 8, the adapter coupled with the arm hook can be coupled with the blade holder 5 simply by fitting the lower panel portions 21 and 23 over central portion 18 of the blade holder and engaging the sockets 25, 27 onto the coupling posts 19. When thus fully coupled, the wiper arm 1 can press against the adapter and blade and can turn relative to them about the cross shaft, but it cannot become detached from the adapter.

The adapter is prevented from turning objectionably relative to the blade holder by being formed with downwardly facing ledges 30 and 32 which extend along the inner sides of the side panels 20 and 22 at a level spaced above the coupling sockets 25 and 27. These ledges comprise and extend backward from the lower border of the front wall 24. They are formed so that they will overlie the upper surface of the central portion 18 of the blade holder when adapter 4 is coupled with the blade holder and, by engaging against that surface, will confine to desired limits any pivotal movement to be permitted between the adapter and the blade holder about the axis of their coupling elements.

As shown in FIGS. 1 and 2-7, the backward upper portions of the adapter panels extend to upper corner portions 42 and 44 thereof at a height above the forward upper portions 31 and 32 joined by the cross shaft 26 and front wall 24. Due to the resilience of the material forming the adapter, these backward upper portions when disposed away from the wiper arm can be converged elastically by the pressure of a person's finger, thus producing a divergence, or spreading apart, of the lower portions 21 and 23 of the panels which can be utilized to aid engagement or disengagement of mating coupling elements on the adapter and the blade holder. This divergence may be so produced to aid coupling or uncoupling of the blade holder even though the adapter is coupled with the wiper arm, if the adapter and blade holder are first turned upward about the hook 2 to a position in which the corner portions 42 and 44 lie below the hook finger 2. It may also be so produced for quick coupling or uncoupling of the adapter on a blade holder destined for use in replacement of a blade holder differently coupled to a wiper arm of the hook type. A slight spreading apart of the lower panel portions, as by pressure converging the backward upper portions of the panels, or by a simple prying tool if so desired, enables the lower edges of the panels to clear the ends of the posts 19 for engagement of these ends with the sloped surfaces 28 and 29 leading to the sockets 25 and 27, or enables these sockets to be moved off the posts for separation of the adapter and blade holder.

The backward upper portions of the adapter panels, as shown in FIGS. 2–4, have inwardly protruding elongate ribs 46 and 48 formed on their inner sides along their backward, normally upright edges. These ribs are positioned to limit or prevent lateral movement of the coupled wiper arm 1 relative to the adapter and blade holder by engaging the side edges of the wiper arm at a distance backward from the hook captured on the cross shaft 26.

A single form of an adapter according to the present invention will serve for coupling blade holders to the more commonly used wiper arms of the hook type, but some wiper arms of this type, as used for short wipers on windshields of of very small automobiles, are considerably narrower than the more usual arms. An adapter for such narrower wiper arms can be provided according to the invention as illustrated at 4A in FIG. 9. This embodiment corresponds to the embodiment described above, excepting that the upper portions 29a and 30a of the adapter panels 20a and 22a are offset inwardly relative to the lower panel portions so that a narrow wiper arm will be suitably confined laterally between these inset upper panel portions. Of course, the cross shaft 26a and the front wall 24a are correspondingly shorter than in the embodiment of FIGS. 1–7.

The invention has been described and illustrated with reference to the particulars of certain preferred embodiments, but it will be apparent that the new features herein set forth may also be employed in other ways while still utilizing the substance of the invention which is intended to be defined by the appended claims.

What is claimed is:

1. An adapter for connecting a wiper blade holder with a windshield wiper arm that terminates in a hook having a finger turned back along the arm, comprising a unitary molded body of resilient material forming two similarly shaped side panels and a front wall and a cross shaft which join together respective forward upper portions of said panels and hold the upper portions of said panels spaced apart to receive said hook between them, said panels having on lower portions thereof elements to mate with and to couple said body to coupling elements on a central portion of said blade holder, said front wall and said cross shaft being spaced apart longitudinally of said panels and disposed relative to said lower portions and to backward upper portions of said panels so that said body apart from the blade holder can be held in a posture in which the space between said shaft and said wall will be aligned with the finger of said hook, whereupon said finger can be passed through said space to engage said shaft pivotably in said hook, said lower portions and said backward upper portions of said panels having between them unobstructed space slightly wider than said hook and through which said hook when engaged with said shaft is free to turn upon an ensuing turning of said body about the axis of said shaft to a position for mating said coupling elements, whereby upon such turning said hook will be captured transversely by said shaft, longitudinally between said shaft and said front wall and laterally between the upper portions of said panels.

2. An adapter according to claim 1, said backward upper portions of said panels extending to corner portions thereof at a height above said forward upper portions and, when disposed away from a wiper arm, being convergeable elastically by pressure of a person's fingers with resultant divergence of the lower panel portions to aid engagement or disengagement of said coupling elements.

3. An adapter according to claim 1, for a wiper blade holder on which the said coupling elements comprise posts protruding from opposite sides of said central portion, said lower portions being formed to straddle said central portion of said blade holder, and said coupling elements on said lower panel portions being sockets therein adapted to fit onto said posts, said backward upper portions of said panels extending to corner portions thereof at a height above said forward upper portions and, when disposed away from a wiper arm, being convergable elastically by pressure of a person's fingers with resultant divergence of said lower panel portions to aid engagement or disengagement of said sockets and posts.

4. An adapter according to claim 1, said backward upward portions of said panels each having on its inner side along its backward edge an inwardly protruding elongate rib positioned to engage a side edge of the hooked end of said wiper arm.

5. An adapter according to claim 1, said upper portions of said panels being thicker than and having their inner surfaces offset inwardly relative to said lower portions of said panels.

6. An adapter for connecting a wiper blade holder with a windshield wiper arm that terminates in a hook having a finger turned back along the arm, comprising a unitary molded body of resilient plastic material forming two similarly shaped side panels and a front wall and a cross shaft which join together respective forward upper portions of said panels and hold said panels spaced apart to receive said hook between them, said panels having lower portions thereof formed to straddle a central portion of said blade holder and having in said lower portions sockets formed to fit upon and thus couple said panels to posts protruding from opposite sides of said central portion, said cross shaft and said front wall being spaced apart longitudinally of said panels and disposed so that said body apart from the blade holder can be held in a posture in which the space between said shaft and said wall will be aligned with the finger of said hook, whereupon said finger can be passed through said space to engage said shaft pivotably in said hook, said lower portions and said backward upper portions of said panels having between them unobstructed space slightly wider than said hook and through which said hook when engaged with said shaft is free to turn upon an ensuing turning of said body about the axis of said shaft to a position for engagement of said sockets upon said posts, whereby upon such turning said hook will be captured transversely by said shaft, longitudinally between said shaft and said front wall and laterally between the upper portions of said panels, said backward upper portions of said panels extending to corner portions thereof at a height above said forward upper portions and, when disposed away from a wiper arm, being convergeable elastically by pressure of a person's fingers with resultant divergence of said lower panel portions to aid engagement or disengagement of said sockets and posts, said panels each having along its inner side at a level spaced above the coupling elements thereon a downwardly facing ledge engagable against the upper surface of said central portion to limit pivotal movement of said body relative to the blade holder when the adapter is coupled onto the blade holder, said backward upward portions of said panels each having on its inner side along its backward edge an inwardly protruding elongate rib positioned to engage a side edge of the hooked end of said wiper arm.

7. An adapter according to claim 6, said upper portions of said panels being thicker than and having inner surfaces offset inwardly relative to said lower portions of said panels.

* * * * *